United States Patent
Yamashita (10) Patent No.: US 7,444,075 B2
(45) Date of Patent: Oct. 28, 2008

(54) IMAGING DEVICE, CAMERA, AND IMAGING METHOD

(75) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 11/437,107

(22) Filed: May 19, 2006

(65) Prior Publication Data
US 2006/0268151 A1 Nov. 30, 2006

(30) Foreign Application Priority Data
May 27, 2005 (JP) ............... 2005-155938

(51) Int. Cl.
G03B 7/00 (2006.01)
(52) U.S. Cl. ............ 396/222; 396/213; 348/362
(58) Field of Classification Search ............ 396/63, 396/65, 89, 166–167, 180, 212–213, 222, 396/322; 348/362
See application file for complete search history.

(56) References Cited

U.S. PATENT DOCUMENTS 6,480,226 B1 11/2002 Takahashi et al.

2003/0095192 A1 5/2003 Horiuchi
2006/0029382 A1* 2/2006 Uchida .............. 396/166
2008/0055461 A1* 3/2008 Ito .................. 348/345

FOREIGN PATENT DOCUMENTS

JP 7-298142 A 11/1995
JP 2002-135648 A 5/2002

OTHER PUBLICATIONS

Brian Wandell, et al., "Multiple Capture Single Image Architecture with a CMOS Sensor", Chiba Conference on Multispectral Imaging, pp. 11-17, 1999.

* cited by examiner

*Primary Examiner*—Bot LeDynh
(74) *Attorney, Agent, or Firm*—Canon U.S.A., Inc., IP Division (57) ABSTRACT

At least one exemplary embodiment is directed to an imaging device, for taking images under different exposure conditions to create a single image, which includes a first condition-obtaining device configured to obtain a first exposure condition candidate for an Nth imaging according to image signals of the imaging prior to the Nth imaging; a second condition-obtaining device configured to obtain a second exposure condition candidate for the Nth imaging according to imaging conditions of the imaging prior to the Nth imaging; and a condition-determining device configured to determine exposure conditions for the Nth imaging according to at least one of the first and second exposure condition candidates.

13 Claims, 7 Drawing Sheets

IMAGING DEVICE, CAMERA, AND IMAGING METHOD

This application claims foreign priority based on Japanese Patent application No. 2005-155938, filed May, 27, 2005, the content of which is incorporated herein by reference in its entirety.

BACKGROUND OF THE INVENTION

1. Field of the Invention

The present invention relates to imaging devices, cameras, and imaging methods.

2. Description of the Related Art

One of the known techniques for taking a single image with a wide dynamic range by multiple exposure is discussed in, for example, Japanese Patent Laid-Open No. 7-298142 (Patent Document 1; corresponding to U.S. Pat. No. 6,480, 226). This publication proposes the idea of taking two images under different exposure conditions, one for highlight regions and the other for shadow regions.

Japanese Patent Laid-Open No. 2002-135648 (Patent Document 2; corresponding to US AA2003095192 (publication)), which references Patent Document 1, discusses the idea of determining suitable exposure conditions for highlight regions and shadow regions using a device configured to obtain pre-imaging information. The suitable exposure conditions can be determined before main imaging by obtaining information on a subject and finding peaks corresponding to highlight regions and shadow regions in a brightness histogram.

Another idea is discussed in Brian A. Wandell, Peter Catrysse, Jeffrey M. DiCarlo, David Yang, and Abbas El Gamal, "Multiple Capture Single Image with a CMOS Sensor", Chiba Conference on Multispectral Imaging, pgs. 11-17, 1999 (Non-Patent Document 1). This idea is to take four images, for example, with amounts of exposure varying in increments of two exposure steps.

The ideas described above have several problems in determining predetermined exposure conditions with a multiple-exposure imaging device.

Patent Document 1 discusses no specific device configured to set exposure conditions suitable for highlight regions and shadow regions.

Patent Document 2 discusses the setting of exposure conditions suitable for peaks in a brightness histogram, although the document does not discuss how to deal with the case where the number of the peaks exceeds the number of images taken in multiple exposure and the case where only one peak appears. The idea discussed in Patent Document 2 thus collapses completely in such cases. In addition, examples of the shapes of histograms shown in embodiments of Patent Document 2 can be difficult to implement practically.

Furthermore, the idea discussed in Patent Document 2 discusses the input of pre-imaging information before main imaging. For motion video applications, for example, the idea has difficulty in achieving high frame rates because the idea involves pre-imaging and the accompanying signal processing for every frame using some device.

According to Non-Patent Document 1, exposure conditions are varied in increments of the same number of exposure steps at all times. This idea leaves room for improvement because it overlooks the brightness distribution of a subject to be imaged and thus can fail to achieve suitable exposure.

SUMMARY OF THE INVENTION

The present invention is directed to an imaging device, a camera, and an imaging method for taking images under different suitable exposure conditions to create a single image.

An imaging device, according to an aspect of the present invention for taking images under different exposure conditions to create a single image, includes a first condition-obtaining device configured to obtain a first exposure condition candidate for an Nth imaging according to image signals of the imaging prior to the Nth imaging; a second condition-obtaining device configured to obtain a second exposure condition candidate for the Nth imaging according to imaging conditions of the imaging prior to the Nth imaging; and a condition-determining device configured to determine exposure conditions for the Nth imaging according to at least one of the first and second exposure condition candidates.

A camera, according to another aspect of the present invention, includes the imaging device described above; a lens configured to focus an optical image; and a diaphragm configured to vary the amount of light passing through the lens.

An imaging method, according to another aspect of the present invention for taking images under different exposure conditions to create a single image, includes the steps of obtaining a first exposure condition candidate for an Nth imaging according to image signals of the imaging prior to the Nth imaging; obtaining a second exposure condition candidate for the Nth imaging according to imaging conditions of the imaging prior to the Nth imaging; and determining exposure conditions for the Nth imaging according to at least one of the first and second exposure condition candidates.

According to another aspect of the present invention, exposure conditions suitable for each situation can be determined according to at least one of the two exposure condition candidates. Images can therefore be taken under different suitable exposure conditions to create a single image. At least one exemplary embodiment is particularly suitable for cases where images taken with different amounts of exposure are synthesized to create a single image with a wide dynamic range.

Further features of the present invention will become apparent from the following description of exemplary embodiments with reference to the attached drawings, in which like reference characters designate the same or similar parts throughout the figures thereof.

The accompanying drawings are incorporated in and constitute a part of the specification.

DESCRIPTION OF THE EMBODIMENTS

First Exemplary Embodiment

Figure 1:
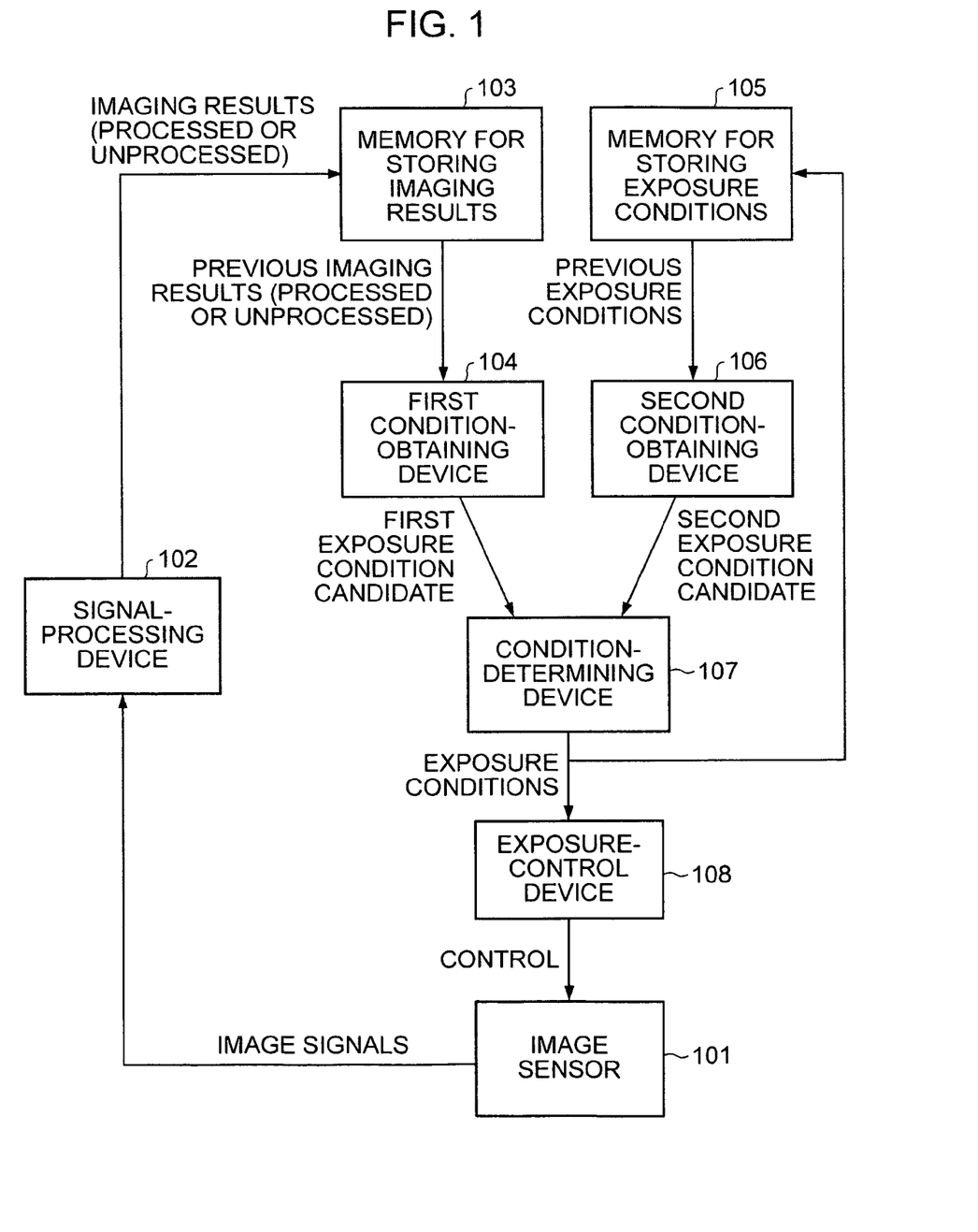
FIG. 1 is a block diagram illustrating an example of a solid-state imaging device according to a first exemplary embodiment of the present invention.

A first exemplary embodiment of the present invention will now be described. FIG. 1 is a block diagram illustrating an example of a solid-state imaging device according to the first exemplary embodiment. An image sensor 101 generates image signals responsive to imaging results by photoelectric conversion and feeds the image signals to a signal-processing device 102. The signal-processing device 102 can store the imaging results in processed or unprocessed form in a memory 103 for storing imaging results. The signal-processing device 102 used can be a general image-processing IC. A first condition-obtaining device 104 obtains a first exposure condition candidate with reference to the results stored in the memory 103. On the other hand, another memory 105 for storing exposure conditions can store exposure conditions for previous imaging. A second condition-obtaining device 106 obtains a second exposure condition candidate based on the previous exposure conditions stored in the memory 105. A condition-determining device 107 determines exposure conditions from the two exposure condition candidates according to an evaluation function. An exposure-control device 108 controls the image sensor 101 and an optical system based on the determined exposure conditions to execute next imaging and contemporaneously store the exposure conditions in the memory 105. Although these devices are illustrated in separate blocks in FIG. 1, the devices can be separate ICs or some of them can be integrated into a single chip.

The imaging device according to this exemplary embodiment can have the features described below.

First, the imaging device can select exposure conditions from the two exposure condition candidates. Even if one of the candidates gives unsuitable exposure conditions in view of the purpose of multiple exposure, that is, in view of achieving a wide dynamic range, the other candidate can give suitable exposure conditions. Of the two candidates, one can be based on previous imaging results and the other can be based on previous imaging conditions. Although the two candidates are associated with each other, they can be obtained from different data, and one of them can be selected for each situation.

Second, the imaging device can reduce the need for imaging intended for determining exposure conditions, thereby achieving higher imaging rates. The imaging device can thus support, for example, an HDTV format demanding a frame rate of 1/60 of a second with low system cost and low power consumption.

Third, the imaging device can determine the amount of light from the brightest subject in an image because the device can store not only previous imaging conditions, such as exposure conditions, but also processed or unprocessed previous imaging results, such as histograms and cumulative histograms. That is, the imaging device can obtain exposure conditions for subsequent imaging according to the brightness of any subject in an image. Hence, the imaging device can readily determine the exposure conditions required for expressing the brightest pixels in subsequent imaging.

The functional blocks described above can be constituted with various configurations and algorithms. The imaging device can of course provide the same features using various devices. Examples of possible appropriate components are described below in non-limiting examples.

The image sensor 101 used can be, for example, a sensor having an amplifier for each pixel. Such a sensor is exemplified by charge-coupled device (CCD) image sensors and complementary metal oxide semiconductor (CMOS) image sensors. The term "sensor" used herein refers to a set of units required for photoelectric conversion, such as a sensor driver and an A/D converter for converting analog outputs into digital form. In the imaging device, all signals transmitted through relevant data paths can be analog or digital, or some of the signals can be digital.

The signal-processing device 102 functions to, for example, directly output image signals, output brightness signals and/or color-difference signals after color processing, output image signals after time-domain or space-domain filtering, convert image signals into a histogram, convert image signals into a cumulative histogram, and process the frequency information by linear or nonlinear transformation.

The memory 103 can store the imaging results of at least one previous frame in processed or unprocessed form.

The first condition-obtaining device 104 can obtain the first exposure condition candidate according to the imaging results of at least one previous frame or a plurality of previous frames extracted every predetermined number of frames. With the previous imaging results, the first condition-obtaining device 104 can obtain such exposure conditions as not to saturate a region corresponding to the brightest subject in an image. If the results of the computation request an aperture smaller than the minimum aperture of the imaging device or a shutter speed higher than the maximum shutter speed of the imaging device, the first condition-obtaining device 104 selects the minimum aperture or maximum shutter speed of the imaging device. If the brightest subject in the image is determined to have a negligible area according to a comparison with a predetermined threshold, the exposure conditions can be adjusted so as to saturate the subject. In addition, the exposure conditions can be adjusted so as to saturate subjects with brightness levels exceeding an independently adjustable threshold determination level.

The memory 105 can store the exposure conditions of at least one previous frame.

The second condition-obtaining device 106 can obtain the second exposure condition candidate according to the exposure conditions of at least one previous frame or a plurality of previous frames extracted every predetermined number of frames. In addition, the second condition-obtaining device 106 can obtain the second exposure condition candidate with a statistical algorithm. For example, the second condition-obtaining device 106 can determine, as the second exposure condition candidate, exposure conditions, which can have a larger amount of exposure than those for previous imaging by a predetermined number of exposure steps.

The condition-determining device 107 is described below. The condition-determining device 107 determines exposure conditions according to, for example, a comparison of the numerical values given, records on several previous frames, or a determination method based on a stochastic process such as a Markov process. The maximum and minimum amounts of exposure can be limited irrespective of the two candidates by, for example, the performance of imaging units such as the image sensor 101 and the optical system and requirements for motion video. These amounts of exposure can be used as independent thresholds to comprehensively determine exposure conditions according to the amounts of exposure and the two candidates. These thresholds can be suitably adjustable. For example, the condition-determining device 107 can select the exposure condition candidate, which can have a larger amount of exposure, from the two candidates to reduce the chance of a black underexposure picture image of shadow subject regions and a decrease in S/N, thus achieving imaging results with priority given to the shadow regions.

The exposure-control device 108 can be based on techniques used in known digital still cameras and digital camcorders.

The imaging device according to this exemplary embodiment can be applied to systems for creating a single image with a wide dynamic range by multiple exposure, that is, by continuously taking images with different exposure times (different amounts of exposure). The continuous imaging can be performed at a predetermined frame rate.

The imaging device according to this exemplary embodiment will be described in more detail with specific examples below. Histograms of images are used in the examples, though other parameters can also be used, as described above.

Figure 2:
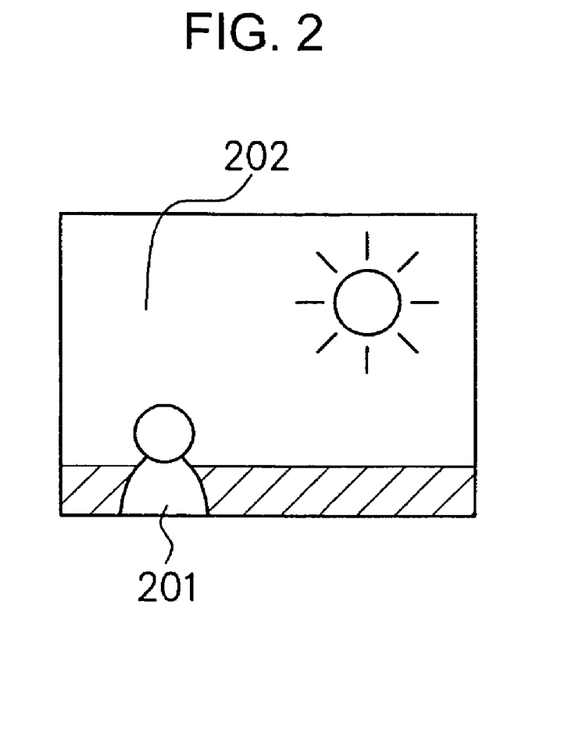
FIG. 2 is a diagram illustrating an example of a subject to be imaged in the first exemplary embodiment of the present invention.
Figure 3:
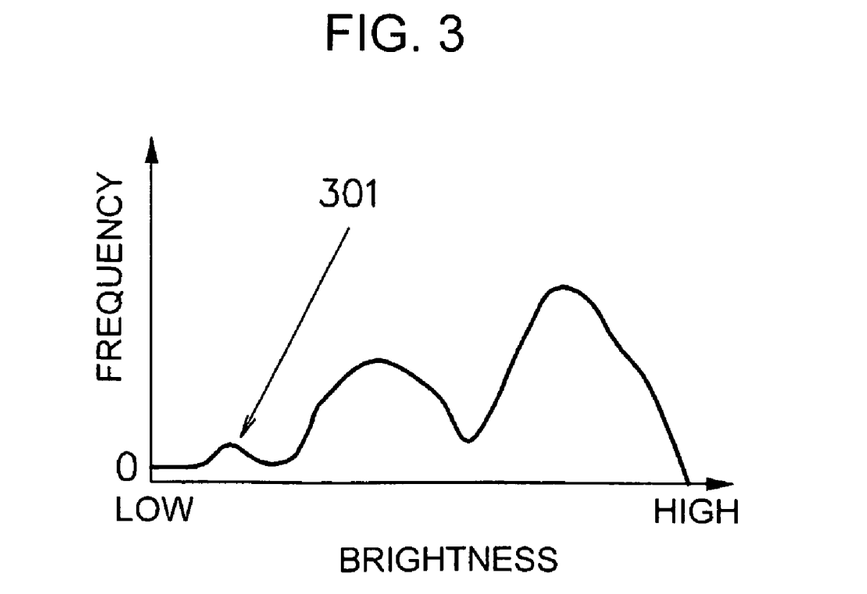
FIG. 3 is an example of a histogram of the subject in the first exemplary embodiment of the present invention.

FIG. 2 is a diagram illustrating an example of a subject to be imaged. A person 201 is backlighted and relatively shadowed. A background 202 having a relatively large area is highlighted under sunlight. FIG. 3 is a histogram of the scene in which the horizontal axis indicates brightness and the vertical axis indicates frequency. Because the person 201 has a small area, a peak 301 corresponding to the person 201 is much lower than other peaks and is thus determined to be less important by known techniques. The known techniques have difficulty in detecting the peak 301 for correct exposure and can only achieve exposure conditions suitable for relatively bright regions.

Figure 4:
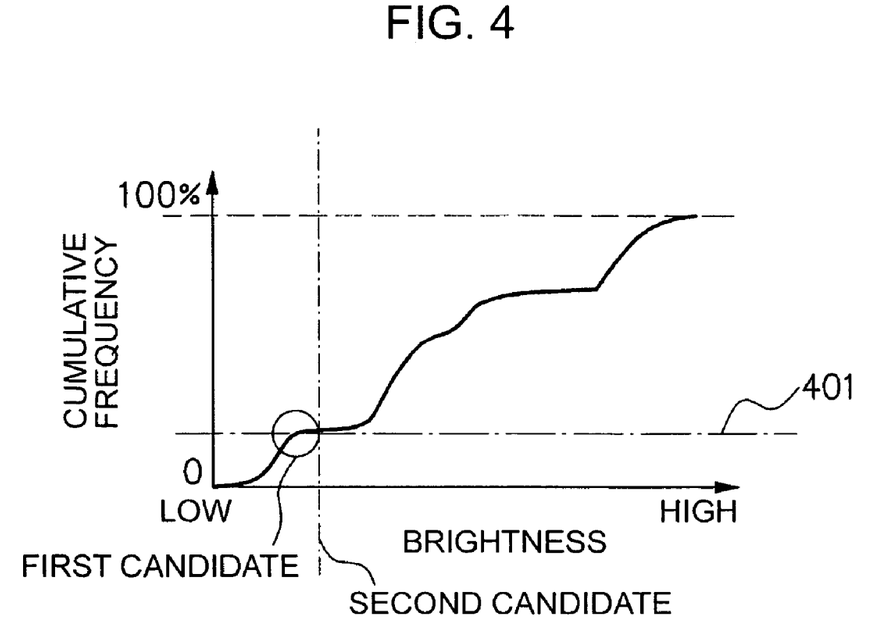
FIG. 4 is an example of a cumulative histogram of the subject in the first exemplary embodiment of the present invention.

FIG. 4 shows a cumulative histogram as an example of imaging results processed by the signal-processing device 102. In FIG. 4, the horizontal axis indicates brightness and the vertical axis indicates cumulative frequency. The cumulative histogram in FIG. 4 is obtained by accumulating the frequencies in the histogram in FIG. 3 in ascending order of brightness. The first condition-obtaining device 104 determines the exposure conditions optimum for the brightness at which the cumulative frequency reaches a threshold determination level 401 as the first exposure condition candidate. The first condition-obtaining device 104 can therefore obtain exposure conditions suitable for a person, a typical subject with relatively low brightness. The threshold determination level 401 used is a design parameter that can be determined by, for example, methods based on neural networks or other stochastic methods or that can be empirically determined by a designer.

In this exemplary embodiment, as described above, a cumulative histogram is used by setting the threshold determination level 401, for example, as a reference for exposure. The threshold determination level 401 provides exposure conditions suitable for the shadow side even though no significant peak appears on the shadow side.

It should be noted that the usefulness of the use of cumulative histograms in this exemplary embodiment is independent of any definition of optimum exposure. To maximize a dynamic range, for example, the amount of exposure can be determined by adjusting the reference brightness described above to the upper or lower limit of a dynamic range in which the imaging device can take images with good reproducibility. For highlight subjects, for example, the reference brightness is adjusted to the upper limit of the dynamic range. For shadow subjects, on the other hand, the reference brightness is adjusted to the lower limit of the dynamic range. The amount of exposure can also be determined with any reference brightness given by a designer, for example, ¼, ½, or ¾ of the upper limit of the dynamic range.

Frequency information can reveal that multiple exposures with a predetermined number of exposure steps cannot provide all information on the brightness of the subject of interest. In that case, a single image can be created with additional imaging results obtained by taking another frame under the exposure conditions optimized for a brightness level that is not covered.

The imaging device facilitates the acquisition of data, on all brightness levels in an image, based on the threshold determination level 401. This can be achieved by continuously storing processed or unprocessed previous imaging results (such as histograms and cumulative histograms) to obtain data on the brightness of the brightest subject in the image.

Figure 5:
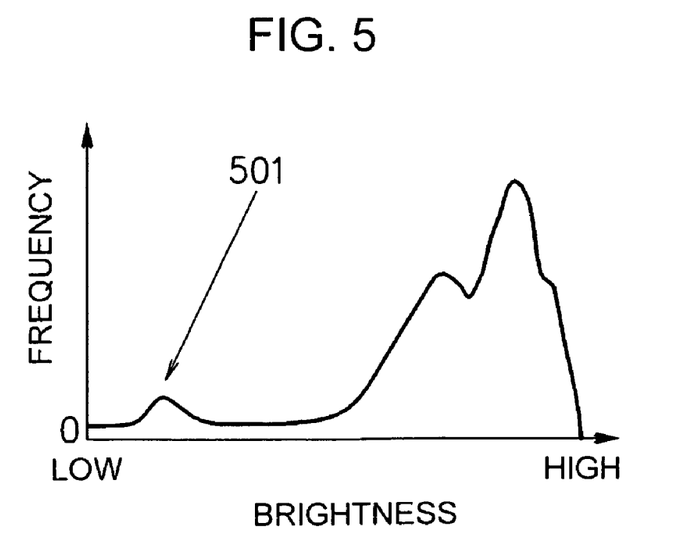
FIG. 5 is an example of a histogram of another subject in the first exemplary embodiment of the present invention.
Figure 6:
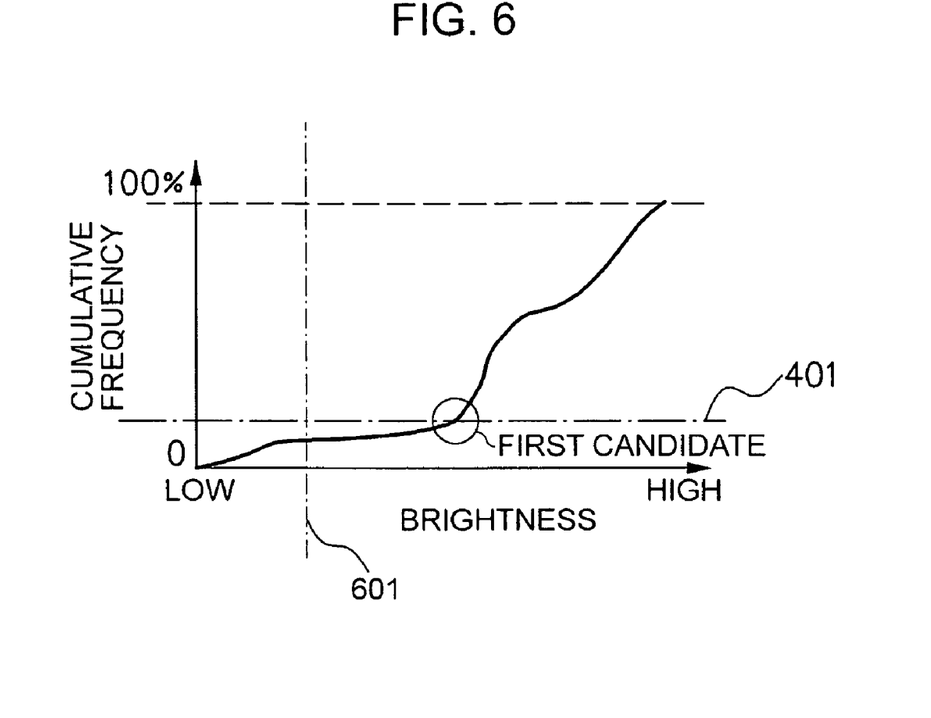
FIG. 6 is an example of a cumulative histogram of the subject in the first exemplary embodiment of the present invention.

Next, the case of a histogram shown in FIG. 5 is described below. A peak 501 is attributed to a person. This histogram suggests a scene where a front subject with relatively low brightness and the background thereof have a large difference in brightness and shadow (low-brightness) regions are relatively small. FIG. 6 is a cumulative histogram obtained from the histogram in FIG. 5. The brightness at which the cumulative frequency reaches the threshold determination level 401 is about half the maximum brightness of the histogram shown in FIG. 4 because the shadow regions include fewer pixels. In this case, the imaging device cannot take an image of the shadow subject with high S/N.

The second condition-obtaining device 106 then gives a second exposure condition candidate 601, as illustrated in FIG. 6, which can have a larger amount of exposure than the previous exposure conditions obtained from the memory 105 by, for example, two exposure steps. The condition-determining device 107 compares the second exposure condition candidate 601 with the first exposure condition candidate to select one of the two candidates. The condition-determining device 107 can be programmed to select the second exposure condition candidate 601, thereby achieving an amount of exposure suitable for the shadow side. Specifically, the second candidate can be selected according to a comparison of the difference in brightness and the area of the shadow regions with respective predetermined values.

According to this exemplary embodiment, even if one condition-obtaining device gives unsuitable exposure conditions, an exposure condition candidate given by the other condition-obtaining device can be selected as exposure conditions. This imaging device can provide a significantly reduced possibility of unsuitable exposure conditions.

The imaging device can attain the dynamic range shown in FIG. 6 by single imaging. In this case, data on the resultant single frame can be reconstituted without performing multiple exposures. That is, a single image can be created from frames taken with different amounts of exposure or from a single frame taken with a single amount of exposure. The imaging device according to this exemplary embodiment allows such selective operation because the device can store a cumulative histogram and thus provides a dynamic range suitable for a subject of interest at all times.

The determination whether a dynamic range given by single imaging is useful can be based on, for example, the condition that signals for specific pixels are not buried in noise or saturated or the condition that signals for a predetermined number of pixels or a predetermined percentage of pixels in each image are not buried in noise or saturated.

Second Exemplary Embodiment

An imaging device according to a second exemplary embodiment of the present invention will be described below. This imaging device has the same structure as in the first exemplary embodiment. In the second exemplary embodiment, particularly, the signal-processing device 102 generates a cumulative histogram with additional information on, for example, color or position to achieve suitable exposure conditions. For better understanding, the corresponding histogram is described before the description of the cumulative histogram. In practice, parameters other than histograms can also be used in the device. The additional information used relates to, for example, brightness, color, space, or changes over time.

Figure 7:
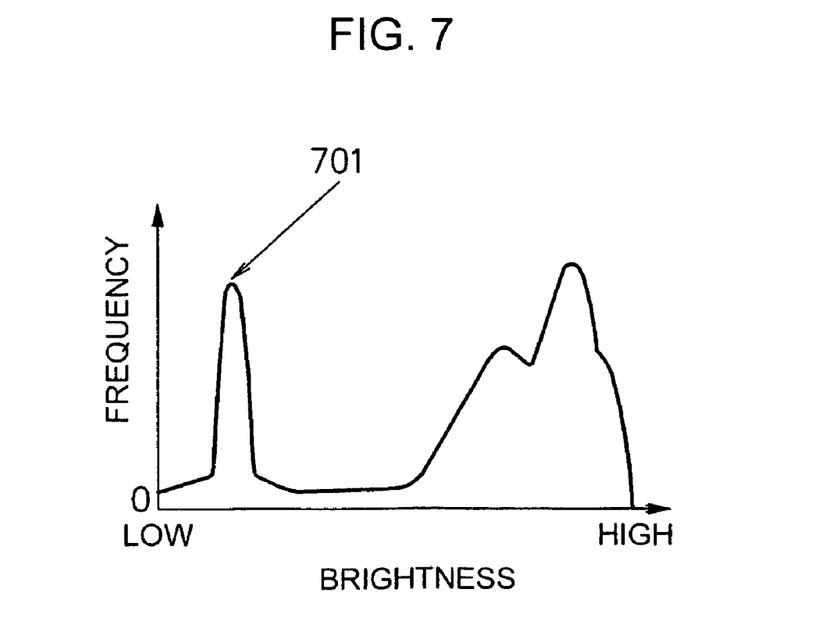
FIG. 7 is an example of a weighted histogram of a subject in a second exemplary embodiment of the present invention.

A histogram similar to FIG. 5 is weighted on the assumption that a region of a predetermined color indicates a person. If the color is recognized on the assumption, for example, the corresponding bin (a frequency count of brightness) of the histogram is increased by 100 points, rather than 1 point. Referring to FIG. 7, thus, a peak 701 indicating a person appears on the shadow side. The features of this exemplary embodiment can of course be achieved using any recognition technique.

Figure 8:
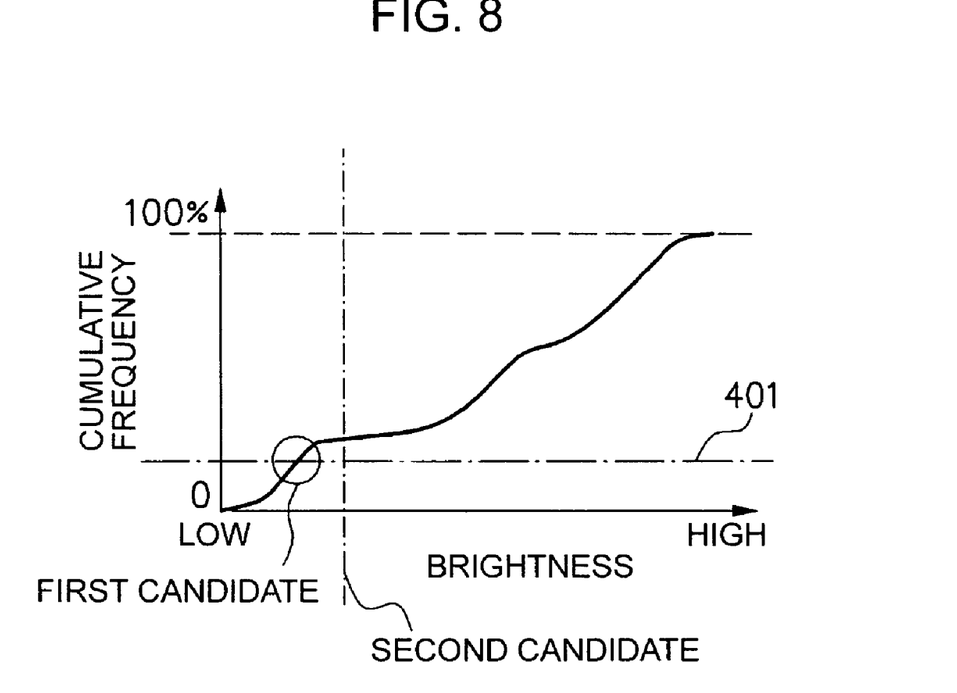
FIG. 8 is an example of a weighted cumulative histogram of the subject in the second exemplary embodiment of the present invention.

The histogram shown in FIG. 7 can be expressed as a cumulative histogram shown in FIG. 8. FIG. 8 shows that the peak 701 in FIG. 7 increases the cumulative frequency on the shadow side. Thus, the cumulative frequency on the shadow side reaches the threshold determination level 401 so that the imaging device can achieve exposure conditions suitable for the shadow side without using fail-safe exposure setting based on the second exposure condition candidate.

The mechanism is described below. An increase in the area of pixels with higher priority on a histogram after weighting is equivalent to an increase in the gradient of a curve representing cumulative frequency. A larger gradient refers to a larger rate of increase in cumulative frequency. Hence, the cumulative frequency is more likely to reach a threshold determination level near the brightness level of the pixels with higher priority. Thus, exposure conditions can be optimized for the pixels with higher priority.

Although the weighting is performed by increasing the points given to pixels of a predetermined color in this exemplary embodiment, the weighting process used is not limited to the example described above. An increased number of points can also be given to, for example, pixels near the center of an image, pixels displaying a moving subject, pixels displaying a green color, or pixels displaying a subject with higher chroma. In addition, an increased number of points can be given to regions with higher spatial frequencies by monitoring the spatial frequencies, or can be given to pixels displaying a subject in closer proximity using a distance mapping function. Alternatively, the number of points given to pixels can be decreased. For example, 0 point (which means no change in frequency) can be given to pixels with low chroma or significantly low spatial frequencies. A negative number of points can be used in combination with a process for preventing the cumulative frequency from crossing a threshold determination level twice or more or with a process for dealing with the case where the cumulative frequency crosses a threshold determination level twice or more.

Third Exemplary Embodiment

An imaging device according to a third exemplary embodiment of the present invention will be described below. While cumulative histograms are used to obtain exposure conditions in the exemplary embodiments described above, non-cumulative histograms are used to obtain exposure conditions in this exemplary embodiment. The imaging device according to this exemplary embodiment has the same structure as in the first exemplary embodiment.

Figure 9:
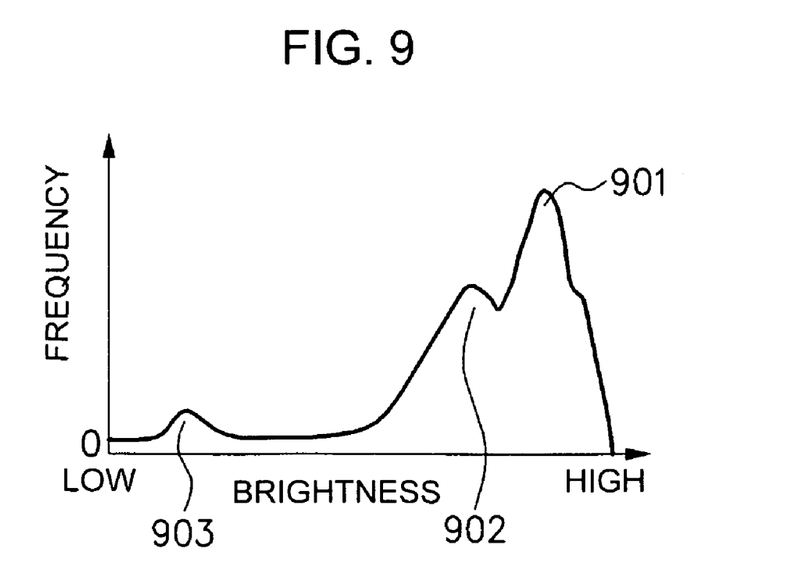
FIG. 9 is an example of a histogram of a subject in a third exemplary embodiment of the present invention.

FIG. 9 is a histogram related to FIG. 5. If imaging is facilitated only twice for each image in multiple exposure and the two highest peaks are used as reference brightness levels, exposure conditions can be determined according to a first peak 901 and a second peak 902. Accordingly, a third peak 903 attributed to a front person is not recognized. In this case, exposure conditions suitable for the subject on the shadow side can be achieved by determining the lower limit of the amount of exposure using the second condition-obtaining device 106 and employing such a determination algorism that the condition-determining device 107 gives priority to the second candidate.

In other words, even if a histogram of a complicated shape makes it difficult to obtain an exposure condition candidate suitable for the shadow side, the other determination mechanism can serve as a fail-safe function to ensure exposure conditions suitable for the shadow side. The imaging device according to this exemplary embodiment also has the features as described in the first exemplary embodiment, including reduced cost and power consumption for motion video applications.

The signal-processing device 102 can generate a histogram using frequency information processed by linear or nonlinear transformation, rather than using unprocessed information.

Fourth Exemplary Embodiment

Figure 10:
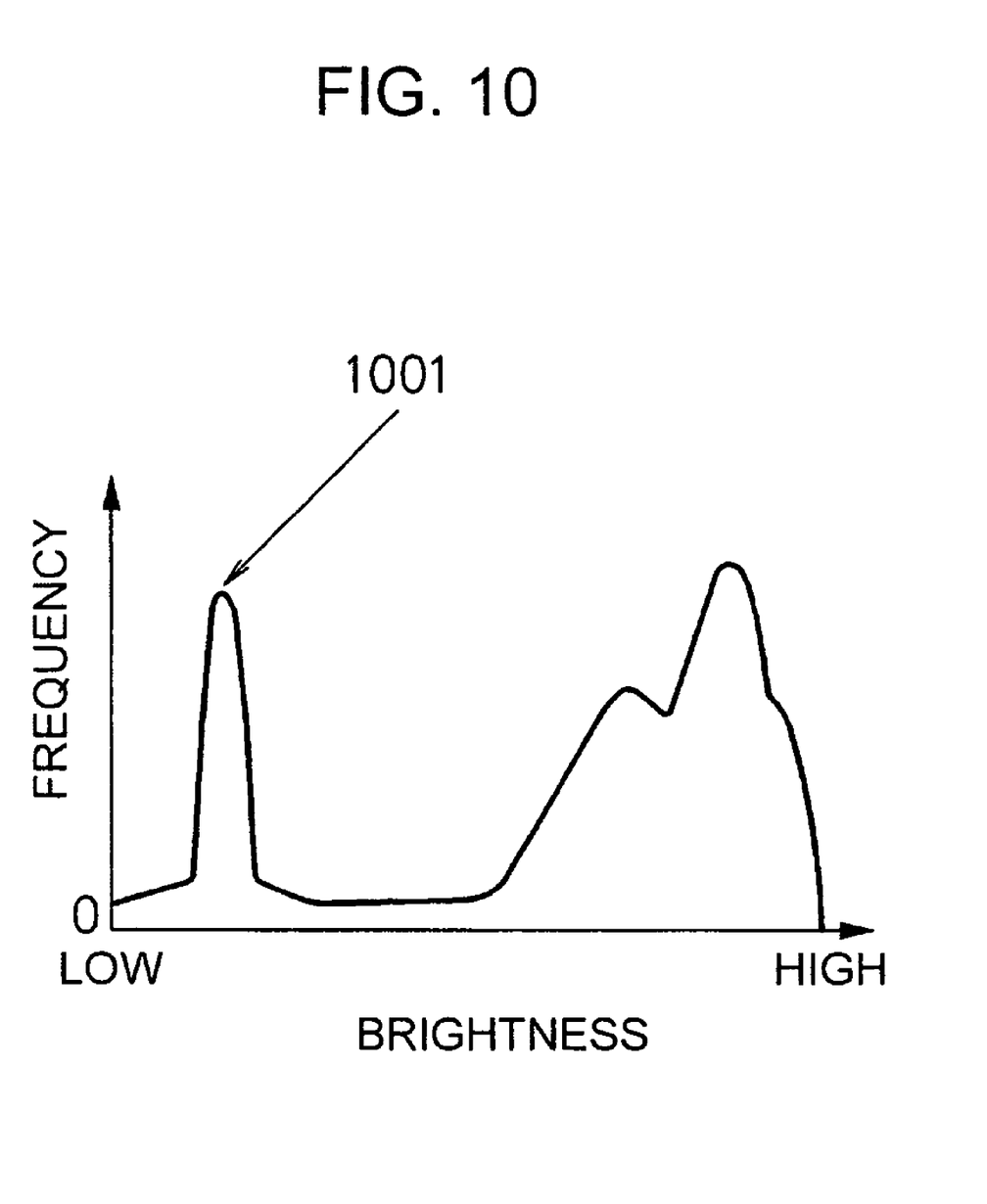
FIG. 10 is an example of a weighted histogram of a subject in a fourth exemplary embodiment of the present invention.

An imaging device according to a fourth exemplary embodiment of the present invention will be described below. A non-cumulative histogram is used in this exemplary embodiment. FIG. 10 is a weighted histogram as described in the second exemplary embodiment. A peak 1001 is attributed to a person. If the weighted histogram is directly used in double exposure, the peak 1001 is recognized as the second highest peak, which corresponds to the third peak 903 in the third exemplary embodiment. The imaging device can therefore determine exposure conditions suitable for the shadow side without giving priority to the second candidate.

In other words, the imaging device can determine suitable exposure conditions without using the second candidate by weighting important regions and thus emphasizing the corresponding peak in the histogram. The important areas can be weighted as in the second exemplary embodiment.

Fifth Exemplary Embodiment

An imaging device according to a fifth exemplary embodiment of the present invention will be described below. This imaging device takes images with different amounts of exposure and synthesizes the images to create a single image with a wide dynamic range. The exposure conditions used can be determined according to data on previous images taken by long exposure.

If the previous images are taken by short exposure, the first condition-obtaining device 104 can fail to obtain an exposure condition candidate, which can have a sufficient amount of exposure. In that case, the resultant histogram does not show clear variations in cumulative frequency. This problem arises irrespective of whether a cumulative histogram or a non-cumulative histogram is used. Although the second condition-obtaining device 106 can provide imaging conditions for short exposure, these imaging conditions are level-shifted under predetermined conditions and thus have difficulty in achieving suitable exposure for long exposure.

If the previous images are taken by long exposure, by contrast, the first condition-obtaining device 104 can detect highlight regions using a histogram or a cumulative histogram. This facilitates real-time control of the amount of exposure for short exposure according to data on the images taken by long exposure. In addition, the condition-determining device 107 can readily compare the first candidate with the second candidate obtained by the second condition-obtaining device 106, even if the condition-determining device 107 eventually selects the second candidate.

Application to Camera

Figure 11:
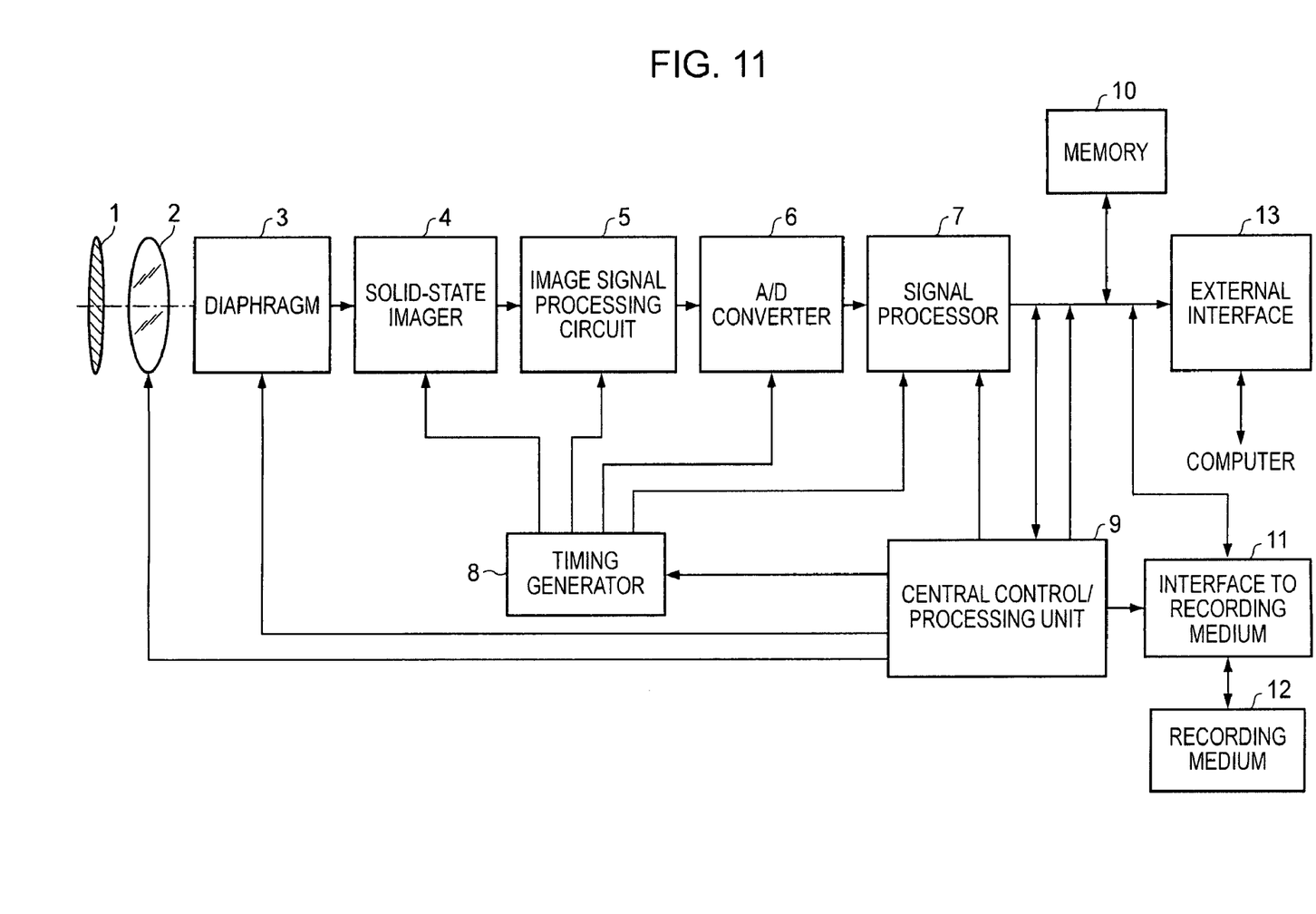
FIG. 11 is a block diagram of an example of a digital still camera including an imaging device according to a fifth exemplary embodiment of the present invention.

An example of a digital still camera including the solid-state imaging device according to any of the first to fifth exemplary embodiments will be described below with reference to FIG. 11. FIG. 11 is a block diagram of an example of a digital still camera including the imaging device according to the fifth exemplary embodiment.

The digital still camera shown in FIG. 11 includes a barrier 1 functioning as a lens protector and a main switch; a lens 2 configured to focus an optical image of a subject; a diaphragm 3 configured to vary the amount of light passing through the lens 2; a solid-state imager 4 (corresponding to the image sensor 101 in FIG. 1) configured to convert the image focused thereon by the lens 2 into image signals; an image signal processing circuit 5 configured to process the image signals output by the solid-state imager 4 in analog form; an A/D converter 6 configured to convert the image signals output by the image signal processing circuit 5 into digital form; a signal processor 7 configured to, for example, correct or compress the image data output by the A/D converter 6; a timing generator 8 configured to feed timing signals to the solid-state imager 4, the image signal processing circuit 5, the A/D converter 6, and the signal processor 7; a central control/processing unit 9 configured to perform various operations and control the overall digital still camera; a memory 10 configured to temporarily store the image data; an interface 11 configured to write or read image data on a removable recording medium 12 such as a semiconductor memory; and another interface 13 configured to communicate with, for example, an external computer.

The imaging operation of the digital still camera is described below. When the barrier 1 is opened, the main switch is turned on, and the control system and the imaging circuits, such as the A/D converter 6, are turned on accordingly. The central control/processing unit 9 then opens the diaphragm 3 to control the amount of exposure. The solid-state imager 4 outputs signals which are transmitted to the A/D converter 6 via the image signal processing circuit 5. The A/D converter 6 converts and feeds the signals to the signal processor 7. The central control/processing unit 9 executes operations based on the data thus obtained to determine brightness, and then controls the diaphragm 3 according to the brightness.

Next, the central control/processing unit 9 calculates the distance to a subject according to the high-frequency component of signals output from the solid-state imager 4. The central control/processing unit 9 then actuates the lens 2 and determines whether the lens 2 is in or out of focus. If the lens 2 is determined to be out of focus, the lens 2 is actuated again before the calculation of the distance to the subject. If the lens 2 is determined to be in focus, main exposure starts. After the completion of the exposure, the solid-state imager 4 feeds image signals to the A/D converter 6 via the image signal processing circuit 5. The A/D converter 6 converts the signals into digital form and outputs them to the signal processor 7. The central control/processing unit 9 can store the signals in the memory 10. Subsequently, the central control/processing unit 9 records the data stored in the memory 10 on the recording medium 12 through the interface 11. The data can also be directly fed to an external computer through the interface 13 and be processed in the computer.

The imaging devices according to the first to fifth exemplary embodiments described above can perform multiple exposure under exposure conditions suitable for a subject with higher priority by selecting the exposure conditions from candidates given by a plurality of determination algorithms. These imaging devices therefore enable high-quality imaging with a wide dynamic range by multiple exposure. In addition, the imaging devices can facilitate reduction in terms of cost and power consumption because they have algorisms suitable for motion video. Furthermore, the imaging devices can generate a weighted histogram to achieve exposure conditions suitable for a subject with higher priority.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-155938 filed May 27, 2005, which is hereby incorporated by reference herein in its entirety.

What is claimed is:

1. An imaging device for taking images under different exposure conditions to create a single image, the imaging device comprising:
    a first condition-obtaining device configured to obtain a first exposure condition candidate for an Nth imaging according to image signals of the imaging prior to the Nth imaging;
    a second condition-obtaining device configured to obtain a second exposure condition candidate for the Nth imaging according to imaging conditions of the imaging prior to the Nth imaging; and
    a condition-determining device configured to determine exposure conditions for the Nth imaging according to at least one of the first and second exposure condition candidates.

2. The imaging device according to claim 1, wherein the condition-determining device determines the exposure conditions for the Nth imaging according to a comparison of the first and second exposure condition candidates.

3. The imaging device according to claim 1, wherein the second condition-obtaining device determines, as the second exposure condition candidate, exposure conditions having a larger amount of exposure than those for the imaging prior to the Nth imaging by a predetermined number of exposure steps.

4. The imaging device according to claim 1, performing continuous imaging at a predetermined frame rate.

5. The imaging device according to claim 1, wherein the first condition-obtaining device obtains the first exposure condition candidate according to a cumulative histogram of pixel outputs of the image signals of the imaging prior to the Nth imaging.

6. The imaging device according to claim 5, wherein the cumulative histogram is weighted according to additional information on the pixel outputs.

7. The imaging device according to claim 6, wherein the additional information includes at least one of brightness, color, space, and changes over time.

8. The imaging device according to claim 1, wherein the first condition-obtaining device obtains the first exposure condition candidate according to a histogram of pixel outputs of the image signals of the imaging prior to the Nth imaging.

9. The imaging device according to claim 8, wherein the histogram is weighted according to additional information on the pixel outputs.

10. The imaging device according to claim 9, wherein the additional information includes at least one of brightness, color, space, and changes over time.

11. The imaging device according to claim 1, wherein the condition-determining device compares the amounts of exposure of the two exposure condition candidates to select the exposure condition candidate having a larger amount of exposure.

12. A camera comprising:

the imaging device according to claim 1;

a lens configured to focus an optical image; and a diaphragm configured to vary the amount of light passing through the lens.

13. An imaging method for taking images under different exposure conditions to create a single image, the imaging method comprising the steps of:

obtaining a first exposure condition candidate for an Nth imaging according to image signals of the imaging prior to the Nth imaging;

obtaining a second exposure condition candidate for the Nth imaging according to imaging conditions of the imaging prior to the Nth imaging; and determining exposure conditions for the Nth imaging according to at least one of the first and second exposure condition candidates.

* * * * *